United States Patent Office 3,480,715
Patented Nov. 25, 1969

3,480,715
DECONTAMINATION AGENTS
Alexander Catsch, Durlach, Karlsruhe, Germany, assignor to Geigy Chemical Corporation, Greenburgh, N.Y., a corporation of Delaware
No Drawing. Filed Sept. 30, 1964, Ser. No. 400,571
Claims priority, application Switzerland, Jan. 14, 1964, 357/64
Int. Cl. A61k 27/00
U.S. Cl. 424—289                    8 Claims

ABSTRACT OF THE DISCLOSURE

The trisodium salt of the zinc complex of diethylene-triamine-N,N,N',N'',N''-pentaacetic acid and the trisodium salt of the zinc complex of triethylenetetramine-N,N,N',N'',N''',N'''-hexaacetic acid disclosed in compositions and parenteral methods of eliminating the fission products of heavy atom nuclei or heavy radioactive isotopes from living organisms.

---

The present invention concerns a process of the elimination of injurious metal ions from living organisms, active substances and agents for performing this process as well as the production of the active substance.

On becoming contaminated with radioactive metals such as, for example, the fission products of heavy atom nuclei, e.g. $^{91}Y$, $^{140}La$, $^{144}Ce$, or the heavy radioactive isotopes encountered in reactor technology, e.g. $^{233}U$, $^{234}Th$, $^{239}Pu$, $^{241}Am$, severe injuries to the health of the organism are incurred. Acute and chronic metal poisonings, however, are also caused by stable isotopes, particularly those of heavy metals such as, e.g. lead and iron ("iron storage disease" in cases of disturbed iron metabolism: haemochromatosis, haemosiderosis).

It is known that such injuries can be avoided or relieved to a great extent if chelating polyaminopolycarboxylic acids are introduced into the circulation of the organism. The injurious metal irons taken up by the organism are bound by these acids into stable, water soluble complexes which can be eliminated from the organism. This process is termed decontamination. In order to reduce the toxicity of these acids or of their neutral salts, in particular to avoid hypocalcemic side effects, the chelating compounds have been used up to now in the form of the neutral sodium salts of their calcium complexes. The diethylene-triamine-N,N,N',N'',N''-pentaacetic acid (abbreviation: DTPA, terminology according to Chemical Abstracts: [(carboxymethylimino) bis(ethylenenitrilo)] tetraacetic acid) in the form of the trisodium salt of its calcium complex has proved to be the most suitable up to the present.

We have found that the known calcium complex of DTPA causes upon prolonged application in larger amounts in certain test animals such as rats or mice certain side effects which are reversible, but which it would be desirable to avoid altogether.

We have now discovered that these side effects are largely due to a tendency of the calcium complex to exchange its calcium atom for complexing metal atoms of certain important enzymes of the kidney, in particular of alkaline phosphatase and thereby cause nephrotoxic effects which can lead even to the exitus of the test animals.

Unexpectedly, the new zinc complexes according to the invention which are of the formula $Na_3[ZnXH_n]$, explained hereinafter, do not show this undesirable extraction of the complexing metals from the aforesaid kidney enzymes, and, also unexpectedly, are nevertheless fully capable of exchanging its zinc atom for the injurious metal atoms such as cerium, yttrium and the other metal isotopes mentioned hereinbefore which are foreign to the said kidney enzymes.

The above advantageous effects of the zinc DTPA complex in the transfusion agents according to the invention are particularly surprising also in view of the fact that the zinc complex, although very stable in itself, is still not as stable as the cobalt DTPA complex, yet the toxicity of the later complex in spite of its higher stability, is quite noticeable.

The trisodium salts of the zinc complexes according to the invention are of the formula

wherein X represents

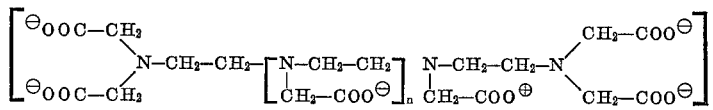

and $n$ is 0 or 1, X being referred to for the sake of brevity as DTPA when $n$ is 0, and as TTHA when $n$ is 1.

On account of their above-mentioned advantageous properties, these zinc complexes of Formula I are considerably more suitable as active substances in agents for the elimination of injurious metal ions from the organism of vertebrates, especially mammals, than the trisodium salts of the corresponding calcium complexes because, surprisingly, they have considerably lower toxicity whilst their decontamination activity, compared with that of the trisodium salts of the calcium complexes, is only inconsiderably less. This results in a larger therapeutical range which, with equivalent effective dosages, reduces the danger of side effects and, if necessary, i.e. in the case of severe poisonings, makes higher dosage possible in order to eliminate the injurious metal ions more quickly.

The trisodium salts of the zinc complexes of DTPA and TTHA serving as active substances according to the invention are obtained free from foreign ions by reacting DTPA or TTHA either simultaneously or in any order desired with the equimolar amount of zinc oxide and with three times the equimolar amount of sodium hydroxide, the reaction being performed in water, and then concentrating the solution obtained if desired. Instead of the metal oxide first used, also the corresponding carbonate or bicarbonate can be used and the reaction mixture can be a suspension or a solution.

For the preparation of the solutions for the application described below, in addition to salts of zinc complexes exempt of foreign ions, also those which contain sodium chloride can be used. Such salt mixtures or aqueous solutions thereof are obtained if, in the above process, zinc chloride is used instead of the oxide or carbonate and five times the equimolar amount of sodium hydroxide is used.

The relatively low toxicity of a complex salt usable according to the invention is shown by the following comparative tests:

In Table I the results of a series of tests to ascertain the sub-chronic toxicity of a compound according to the invention is compared with the data obtained on application of the corresponding trisodium salt of the calcium complex of DTPA. Rats of both sexes having an average weight of about 280 grams were used as test animals. The dose was administered intraperitoneally and administration was repeated daily. One column in the said table gives the number of dosages administered. The dosages are in millimols per kg. animal body weight (mM./kg.) (Molecular weight of the zinc complex: 522.7).

TABLE I

| $Na_3$ (MeX) complex administered. X=anion of DTPA Me= | Dose in mM./kg. | Number of dosages administered | Number of dead animals/number of tested animals (in %) |
|---|---|---|---|
| Ca | 2.0 | 16 | 100 |
| Ca | 2.5 | 16 | 100 |
| Zn | 2.5 | 15 | 0 |
| Co | 2.0 | 10 | 20 |

The slight toxicity of the compound $Na_3$(ZnDTPA) can also be seen from the results of toxicity tests on mice. On administration of a dosage of 6.0 mM./kg. (average animal weight 31 g.) intraperitoneally for 17 consecutive days, the mortality, i.e. the $$\frac{\text{number of dead animals}}{\text{number of tested animals}}$$

expressed in percent was 0.

The salts used according to the invention, i.e. the trisodium salts of the zinc complexes of DTPA and TTHA, are advantageously administered in the form of 25%-aqueous solutions containing no pyrogenous substances. (0.25 g. of the anhydrous complex salt per 1 ml. solution.) These solutions are suitable for parenteral administration, in particular for venous transfusion as well as intramuscular injection. A daily dosage of 20 to 100 mg./kg. of bodyweight, calculated on the anhydrous complex salts, in a 25% solution is administered daily depending on the extent and seriousness of the poisoning or disease.

In the case of intravenous application, it is advantageous to dilute the amount corresponding to these dosages with isotonic sodium chloride or with 5%-glucose solution, the dilution being so made that 0.1 to 0.5% solutions, calculated on the anhydrous complex salt, are obtained and then to carry out the transfusion of these solutions slowly.

In the case of intramuscular administration, advantageously 1 to 2% of procain or an amount of another local anaesthetic having an equivalent effect thereto, are added to the 25% solutions of the complex salts to reduce local irritation.

The following non-limitative examples described the production of the active substance as well as the production of suitable forms for application.

EXAMPLE 1

81.4 g. of zinc oxide (1 gram mol) and 393 g. of DTPA (1 gram mol) are suspended in 800 ml. of water and the mixture is heated until complete solution is obtained. To ascertain whether both reaction partners are present in exactly equivalent amounts, the solution is brought to a volume of 1000 ml. and a sample of 5 ml. is taken therefrom. This is diluted with water to about 50 ml. and 3 ml. of a buffer solution containing per 1000 ml., 350 ml. of ammonia and 54 g. of ammonium chloride are added. 5–10 drops of a 0.4% alcoholic solution of an Eriochrome Black T indicator are added to this solution. If there is an excess of zinc, the solution turns red, if there is an excess of DTPA, it turns pale blue. The sample is then titrated with a 0.1 molar solution of the reaction partner of which there is a deficiency until the color of the solution turns red or pale blue.

From the result of the titration of the sample, the reaction solution is corrected by a corresponding addition of the insufficiently present reaction partner. 95% of the calculated amount of sodium hydroxide (100% =120 g.=3 gram mols) is then added to the corrected solution. Neutralization is continued by the addition of an approximately 5-molar aqueous NaOH solution until the solution has a pH of 7.3. On concentrating this solution under water jet vacuum (end temperature 60° C.) and then drying the residue in the air to constant weight, a product of the empiric formula $C_{14}H_{18}O_{10}N_3Zn$ containing about 4.5 mols of water of crystallization is obtained.

EXAMPLE 2

13.0 g. of zinc oxide, (0.16 gram mol) and 79.0 g. of TTHA (0.16 gram mol) are suspended in 800 ml. of water and the mixture is heated until complete solution is obtained. To this solution is then added 95% of the calculated amount of sodium hydroxide (100%=19.2 g.=0.48 gram mol). The neutralization is then achieved by addition of a 5-molar sodium hydroxide solution, until the pH of the reaction medium attains a value of 7.3. The total volume of the solution is then brought to 1000 ml. by dilution with water and a solution is thus obtained which contains 10% (weight to volume) of anhydrous sodium salt of the zinc complex of TTHA, corresponding to the general formula $C_{18}H_{25}O_{12}N_4Na_3Zn$.

EXAMPLE 3

25%-aqueous solutions of the trisodium salt of the zinc complex of DTPA are sterilized in ampoules. For administration, from 4.0 ml. to 22.0 ml. (this corresponds to 1 to 5.5 g. of the anhydrous complex salt) of such solutions are combined with suitable solutions for transfusion, in particular with sterile, isotonic sodium chloride solution or with sterile aqueous 5%-glucose solution, so that solutions ready for use in transfusions are obtained which contain from 0.1% to 0.5% of the above complex salt.

Corresponding solutions of the trisodium salt of the zinc complex of TTHA are prepared in an analogous manner.

We claim:

1. An agent for the elimination of fission products of heavy atom nuclei or heavy radioactive isotopes from the organisms of vertebrates, consisting essentially of an aqueous solution for parenteral administration and, as the active ingredient, from 0.1 to 0.5%, by weight, calculated on the total weight of the agent, of a member selected from the group consisting of the trisodium salt of the zinc complex of diethylene-triamine-N,N,N',N'',N''-pentaacetic acid, and the trisodium salt of the zinc complex of triethylenetetramine-N,N,N',N'',N''',N'''-hexaacetic acid.

2. An agent as defined in claim 1 in which the active ingredient is the trisodium salt of the zinc complex of triethylenetetramine-N,N,N',N'',N''',N'''-hexaacetic acid.

3. A transfusion agent consisting essentially of an aqueous solution adapted for venous transfusion and, as the active ingredient, from 0.1 to 0.5% by weight, calculated on the total weight of the agent, of a member selected from the group consisting of the trisodium salt of the zinc complex of diethylenetriamine-N,N,N',N'',N''-pentaacetic acid and the trisodium salt of the zinc complex of triethylenetetramine-N,N,N',N'',N''',N'''-hexaacetic acid.

4. A transfusion agent consisting essentially of a sterile, isotonic sodium chloride solution and from 0.1 to 0.5% by weight, calculated on the total weight of the agent, of a member selected from the group consisting of the trisodium salt of the zinc complex of diethylenetriamine-N,N,N',N'',N''-pentaacetic acid and the trisodium salt of the zinc complex of triethylenetetramine-N,N,N',N'',N''', N'''-hexaacetic acid.

5. A transfusion agent consisting essentially of an about 5%-sterile aqueous glucose solution and from 0.1 to 0.5% by weight, calculated on the total weight of the agent, of a member selected from the group consisting of the trisodium salt of the zinc complex of diethylenetriamine-N,N,N',N'',N''-pentaacetic acid and the trisodium salt of the zinc complex of triethyleneteramine-N,N,N',N'',N''',N'''-hexaacetic acid.

6. A process for the elimination of fission products of heavy atom nuclei or heavy radioactive isotopes from the organisms of vertebrates, comprising parenterally introducing into the organism an effective amount of a member selected from the group consisting of the trisodium salt of the zinc complex of diethylenetriamine-N,N,N',N'',N''-pentaacetic acid and the trisodium salt of the zinc complex of triethylenetetramine-N,N,N',N'',N''',N'''-hexaacetic acid.

7. A process according to claim 6, wherein the said member is administered parenterally to a mammal in a dosage of 20 to 100 milligrams per kg. of bodyweight of the mammal.

8. A process as described in claim 6, wherein the said member is administered to a mammal by venous transfusion in a dosage of 20 to 100 mililgrams per kg. of bodyweight of the mammal.

No references cited.

ALBERT T. MEYERS, Primary Examiner

S. MANELLO, Assistant Examiner

U.S. Cl. X.R.
260—429; 424—001